United States Patent
Li et al.

(10) Patent No.: US 12,195,347 B2
(45) Date of Patent: Jan. 14, 2025

(54) METHOD FOR REGULATING PARTICLE SIZE OF PRUSSIAN WHITE

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Yongguang Li, Guangdong (CN); Changdong Li, Guangdong (CN); Xueliu Xu, Guangdong (CN); Genghao Liu, Guangdong (CN); Dingshan Ruan, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/566,386

(22) PCT Filed: Sep. 22, 2022

(86) PCT No.: PCT/CN2022/120628
§ 371 (c)(1),
(2) Date: Dec. 1, 2023

(87) PCT Pub. No.: WO2024/036701
PCT Pub. Date: Feb. 22, 2024

(65) Prior Publication Data
US 2024/0262702 A1    Aug. 8, 2024

(30) Foreign Application Priority Data
Aug. 15, 2022  (CN) .......................... 202210975464.9

(51) Int. Cl.
*C01C 3/12*       (2006.01)

(52) U.S. Cl.
CPC ............ *C01C 3/12* (2013.01); *C01P 2004/03* (2013.01); *C01P 2004/38* (2013.01); *C01P 2004/61* (2013.01); *C01P 2006/11* (2013.01)

(58) Field of Classification Search
CPC .... C01C 3/12; C01P 2004/03; C01P 2004/38; C01P 2004/61; C01P 2006/11

USPC ......................................... 423/367
See application file for complete search history.

(56) References Cited

U.S. PATENT DOCUMENTS

| | | | |
|---|---|---|---|
| 10,899,632 | B2 | 1/2021 | Brant et al. |
| 2012/0077037 | A1 | 3/2012 | Kawamoto et al. |
| 2021/0043932 | A1 | 2/2021 | Lu et al. |

FOREIGN PATENT DOCUMENTS

| | | |
|---|---|---|
| CN | 109065847 A | 12/2018 |
| CN | 109715558 A | 5/2019 |
| CN | 110451525 A | 11/2019 |
| CN | 111252784 A | 6/2020 |
| CN | 111943227 A | 11/2020 |
| CN | 112209409 A | 1/2021 |
| CN | 114388757 A | 4/2022 |
| CN | 114551805 A | 5/2022 |
| CN | 114853033 A | 8/2022 |
| WO | 2020040338 A1 | 2/2020 |

OTHER PUBLICATIONS

International Search Report with Written Opinion of the International Searching Authority issued by the China National Intellectual Property Administration for International Patent Application No. PCT/CN2022/120628, mailed on Jan. 18, 2023, with an English translation.

First Office Action and Search Report issued by the State Intellectual Property Office of People's Republic of China for Chinese Patent Application No. 202210975464.9, dated Mar. 31, 2023, with an English translation.

*Primary Examiner* — Edward M Johnson
(74) *Attorney, Agent, or Firm* — MYERS WOLIN, LLC

(57) ABSTRACT

A method includes: (1) adding a food-grade manganese sulfate solution and a complexing agent solution into a sodium ferrocyanide solution for a precipitation reaction to generate Prussian white crystal nucleus; (2) replacing the food-grade manganese sulfate solution with an industrial-grade manganese sulfate solution, and keeping other conditions unchanged, so that the Prussian white crystal nucleus grow continuously to obtain a slurry; and (3) successively subjecting the slurry to an aging reaction, solid-liquid separation, washing and drying to obtain a Prussian white product with a specific particle size. The food-grade manganese sulfate solution, and the sodium ferrocyanide solution are subjected to the precipitation reaction, and then the industrial-grade manganese sulfate solution are added to continue a precipitation reaction. The particle size of the Prussian white is regulated by controlling an adding time of the two manganese sulfate solutions.

20 Claims, 2 Drawing Sheets

METHOD FOR REGULATING PARTICLE SIZE OF PRUSSIAN WHITE

CROSS-REFERENCE TO RELATED APPLICATION

The present application is a national phase entry under 35 USC § 371 of International Application PCT/CN2022/120628, filed Sep. 22, 2022, which claims the benefit of and priority to Chinese Patent Application No. 202210975464.9, filed Aug. 15, 2022, the entire disclosures of these applications are incorporated herein by reference.

TECHNICAL FIELD

The present disclosure relates to the technical field of sodium ion battery cathode materials, in particular to a method for regulating a particle size of Prussian white.

BACKGROUND

As the price of lithium salts has been high, sodium ion cathode materials have received increasing attention. Prussian white is a sodium ion cathode material with relatively low price, and has a specific discharge capacity reaching 150 mAh/g to 160 mAh/g, which is almost the same as that of 523 series ternary cathode materials. However, the compaction density of Prussian white is far from the ternary material, which limits the application and development of Prussian white.

CN111252784 discloses a preparation method of a manganese-based Prussian white cathode material, comprising the following steps of: 1) dissolving a manganese salt containing divalent manganese ions in deionized water to form a solution A; 2) dissolving sodium ferrocyanide in deionized water to form a solution B; 3) dropping the solution A into the solution B for a coprecipitation reaction to obtain a suspension solution; and 4) moving the suspension solution obtained in the step 3) into a reaction kettle, adding a soluble sodium salt, performing a hydrothermal reaction for a certain time, and performing suction filtration, drying and precipitation to obtain the manganese-based Prussian white cathode material. The preparation method can control the shape and size distribution of the product, and the prepared manganese-based Prussian white has good crystallinity, which can significantly improve an electrochemical performance of a sodium ion battery, especially a charge and discharge capacity, when used in an electrode of the sodium ion battery.

CN109065847A discloses a Prussian white composite material and a preparation method and use thereof, wherein the Prussian white composite material comprises Prussian white and graphene, a surface of Prussian white nanoparticles is completely coated by the graphene, and the Prussian white particles coated with the graphene are mutually bonded to assemble composite material particles. The particle size of the composite material is 1 to 12 μm, wherein the particle size of Prussian white is 10 nm to 50 nm. The preparation process comprises the steps of: preparing Prussian white by a special process, mixing the Prussian white with the graphene, and carrying out dry-process ball milling to obtain the Prussian white composite material. The Prussian white composite material prepared by the above process may be used as a cathode material in an alkali metal or alkali-like ion battery, which can significantly improve a rate capability of the battery while ensuring high capacity and excellent cycle performance.

CN114388757A discloses a Prussian white material that may be used in a sodium ion battery cathode and a preparation method thereof, comprising reacting an inorganic sodium salt aqueous solution, an $Na_4Fe(CN)_6$ solution and an inorganic metal salt aqueous solution in an anaerobic or oxygen-free atmosphere of 0.2 MPa to 10 MPa at 50° C. to 100° C. Compared with the traditional process, the reaction time of the technical solution is greatly shortened; the Prussian white material has high crystallinity, less coordinated water and sodium content close to a theoretical value, and the electrical property of the prepared battery is remarkably improved, and particularly, the cycle life is prolonged; the Prussian white material has high compaction density, good processability, and significantly improved volume energy density and mass energy density.

However, in the above preparation methods, the particle size of Prussian white is not regulated, and the production efficiency is low. Therefore, it is of great practical significance to develop a method for regulating a particle size of Prussian white which has high production efficiency and is convenient to operate.

SUMMARY

In view of the problems existing in the prior art, the present disclosure provides a method for regulating a particle size of Prussian white, comprising subjecting a food-grade manganese sulfate solution and a sodium ferrocyanide solution to a precipitation reaction, and then adding an industrial-grade manganese sulfate solution to continue a precipitation reaction. The particle size of the Prussian white is regulated by controlling an adding time of the two manganese sulfate solutions, so that the Prussian white product has excellent rate capability and higher compaction density.

In order to achieve this object, the present disclosure uses the following technical solutions.

The present disclosure provides a method for regulating a particle size of Prussian white, comprising the following steps of:
(1) adding a food-grade manganese sulfate solution and a complexing agent solution into a sodium ferrocyanide solution for a precipitation reaction to generate Prussian white crystal nucleus;
(2) replacing the food-grade manganese sulfate solution with an industrial-grade manganese sulfate solution, and keeping other conditions unchanged, so that the Prussian white crystal nucleus grow continuously to obtain a slurry; and
(3) successively subjecting the slurry to an aging reaction, solid-liquid separation, washing and drying to obtain a Prussian white product with a specific particle size.

It is found by the inventor that when the industrial-grade manganese sulfate and the food-grade manganese sulfate react with the sodium ferrocyanide to prepare Prussian white, the particle size difference of Prussian white products obtained is huge. Under the same process conditions, the Prussian white prepared from the industrial-grade manganese sulfate has a particle size of 2 μm to 3 μm; while the Prussian white prepared from the food-grade manganese sulfate has a particle size of about 0.5 μm. In order to improve a rate capability of a battery prepared from the Prussian white, the particle size of the Prussian white product needs to be reduced properly, and when the particle size is reduced, the compaction density of the Prussian white product is reduced obviously. Therefore, the Prussian white with a particle size of 0.8 μm to 2 μm needs to be prepared.

The method for regulating the particle size of Prussian white according to the present disclosure is a precipitation method, which comprises reacting a small amount of food-grade manganese sulfate solution with the sodium ferrocyanide solution to prepare a Prussian white crystal nucleus, and then adding an industrial-grade manganese sulfate solution for reaction without changing other reaction parameters, to grow Prussian white to 0.8 μm to 2 μm.

In the present disclosure, first reacting the food-grade manganese sulfate solution with the sodium ferrocyanide solution is because that the industrial-grade manganese sulfate (the standard GB/T 15899-2021 "Chemical Reagent—Manganese Sulfate Monohydrate) has certain requirements for the contents of various impurity metal elements. The food-grade manganese sulfate (the standard GB/T 29208-2012 "Food Additive Manganese Sulfate") requires to strictly control the contents of As, Pb and Se, which are toxic and harmful to human body. In appearance, the industrial-grade manganese sulfate has obvious lumps, and the food-grade manganese sulfate particles are finer, with almost no lumps. When being prepared into solutions with the same concentration, a pH value of the industrial-grade manganese sulfate solution is 3.6, and a pH of the food-grade manganese sulfate solution is 1.9. When Prussian white was prepared with a lower pH value, it was easier to nucleate a lot, thus reducing the particle size of the Prussian white. The regulating method of the present disclosure has simple operation and high production efficiency, and the obtained Prussian white product with a specific particle size has excellent rate capability and higher compaction density.

Preferably, the complexing agent solution in the step (1) comprises any one or a combination of at least two of a citric acid solution, a maleic acid solution, a wolfberry acid solution, an ethylenediamine tetraacetic acid solution, a sodium citrate solution or aqueous ammonia, wherein a typical but non-limiting combination comprises a combination of the citric acid solution and the maleic acid solution, a combination of the wolfberry acid solution and the ethylenediamine tetraacetic acid solution, a combination of the sodium citrate solution and the aqueous ammonia and the citric acid solution, or a combination of the maleic acid solution, the wolfberry acid solution and the ethylenediamine tetraacetic acid solution.

Preferably, a concentration of the sodium ferrocyanide solution in the step (1) is 0.3 mol/L to 0.6 mol/L, for example, 0.3 mol/L, 0.35 mol/L, 0.4 mol/L, 0.5 mol/L, 0.55 mol/L or 0.6 mol/L.

Preferably, a concentration of the food-grade manganese sulfate solution is 0.4 mol/L to 2 mol/L, for example, 0.4 mol/L, 0.5 mol/L, 0.8 mol/L, 1 mol/L, 1.5 mol/L or 2 mol/L.

Preferably, a concentration of the complexing agent solution is 0.4 mol/L to 15 mol/L, for example, 0.4 mol/L, 1 mol/L, 3 mol/L, 5 mol/L, 10 mol/L or 15 mol/L.

Preferably, a molar ratio of the food-grade manganese sulfate solution to the complexing agent solution in the step (1) is (0.1 to 20): 1, for example, 0.1:1, 1:1, 3:1, 5:1, 10:1, 15:1 or 20:

Preferably, the precipitation reaction is carried out at a temperature of 50° C. to 98° C., for example, 50° C., 55° C., 60° C., 80° C., 90° C. or 98° C.

Preferably, nitrogen is introduced during the precipitation reaction.

Preferably, stirring is carried out during the precipitation reaction.

Preferably, the stirring is carried out at a rate of 200 rpm to 500 rpm, for example, 200 rpm, 250 rpm, 300 rpm, 400 rpm, 450 rpm or 500 rpm.

Preferably, an adding time of the food-grade manganese sulfate solution during the precipitation reaction is 0.12 hour to 2 hours, for example, 0.12 hour, 0.3 hour, 0.5 hour, 1 hour, 1.5 hours or 2 hours.

According to the present disclosure, the adding time of the food-grade manganese sulfate solution during the precipitation reaction is preferably 0.12 hour to 2 hours, and the particle size of the finally obtained Prussian white product is regulated by regulating the adding time of the food-grade manganese sulfate solution, so that the Prussian white product is guaranteed to have a particle size within the range of 0.8 μm to 2 μm, and has excellent rate capability and high compaction density.

Preferably, a particle size of the Prussian white crystal nucleus in the step (1) is 0.3 μm to 0.6 μm, for example, 0.3 μm, 0.35 μm, 0.4 μm, 0.5 μm, 0.55 μm or 0.6 μm.

Preferably, a concentration of the industrial-grade manganese sulfate solution in the step (2) is 0.4 mol/L to 2 mol/L, for example, 0.4 mol/L, 0.5 mol/L, 0.8 mol/L, 1 mol/L, 1.5 mol/L or 2 mol/L.

Preferably, a total adding time of the food-grade manganese sulfate solution in the step (1) and the industrial-grade manganese sulfate solution in the step (2) is 8 hours.

The food-grade manganese sulfate solution, the industrial-grade manganese sulfate solution and the complexing agent solution are all introduced into the reaction kettle filled with the sodium ferrocyanide solution by a metering pump.

Preferably, a molar ratio of the sodium ferrocyanide solution to a total amount of the food-grade manganese sulfate solution in the step (1) and the industrial-grade manganese sulfate solution in the step (2) is (1 to 1.2): 1, for example, 1:1, 1.05:1, 1.08:1, 1.1:1, 1.15:1 or 1.2:1.

Preferably, the aging reaction in the step (3) is carried out at a temperature of 30° C. to 98° C., for example, 40° C., 50° C., 60° C., 70° C., 80° C., 90° C. or 98° C.

Preferably, the aging reaction lasts for 3 hours to 24 hours, for example, 3 hours, 5 hours, 10 hours, 15 hours, 20 hours or 24 hours.

Preferably, the washing comprises pure water washing.

Preferably, the drying is carried out at a temperature of 150° C. to 180° C., for example, 150° C., 155° C., 160° C., 170° C., 175° C. or 180° C.

Preferably, the particle size of the Prussian white product in the step (3) is 0.8 μm to 2 μm, for example, 0.8 μm, 0.85 μm, 1 μm, 1.5 μm, 1.8 μm or 2 μm.

As a preferred technical solution of the present disclosure, the method for regulating the particle size of Prussian white comprises the following steps of:

(1) adding the food-grade manganese sulfate solution with a concentration of 0.4 mol/L to 2 mol/L and the complexing agent solution with a concentration of 0.4 mol/L to 15 mol/L into the sodium ferrocyanide solution with a concentration of 0.3 mol/L to 0.6 mol/L, introducing nitrogen, and carrying out the precipitation reaction at a temperature of 50° C. to 98° C. at a stirring rate of 200 rpm to 500 rpm to generate the Prussian white crystal nucleus with a particle size of 0.3 μm to 0.6 μm;

wherein the complexing agent solution comprising any one or a combination of at least two of a citric acid solution, a maleic acid solution, a wolfberry acid solution, an ethylenediamine tetraacetic acid solution, a sodium citrate solution or aqueous ammonia; a molar ratio of the food-grade manganese sulfate solution to the complexing agent solution is (0.1 to 20):1; and an adding time of the food-grade manganese sulfate solution during the precipitation reaction is 0.12 hour to 2 hours;

(2) replacing the food-grade manganese sulfate solution with the industrial-grade manganese sulfate solution with a concentration of 0.4 mol/L to 2 mol/L, and keeping other conditions unchanged, so that the Prussian white crystal nucleus grows continuously to obtain a slurry;

wherein a total adding time of the food-grade manganese sulfate solution in the step (1) and the industrial-grade manganese sulfate solution in the step (2) is 8 hours; and a molar ratio of the sodium ferrocyanide to a total amount of the food-grade manganese sulfate solution in the step (1) and the industrial-grade manganese sulfate solution in the step (2) is (1 to 1.2): 1; and (3) successively subjecting the slurry to the aging reaction at a temperature of 30° C. to 98° C. for 3 hours to 24 hours, solid-liquid separation, pure water washing and drying at a temperature of 150° C. to 180° C. to obtain the Prussian white product with a particle size of 0.8 μm to 2 μm.

Compared with the prior art, the present application at least has the following advantageous effects:

(1) the method for regulating the particle size of Prussian white provided by the present disclosure can regulate the particle size of the Prussian white by only simply changing the type of the manganese sulfate solution without changing other reaction conditions, which is convenient to operate, simple and controllable; and (2) the particle size of the Prussian white product obtained through the method for regulating the particle size of Prussian white provided by the present disclosure is 0.8 μm to 2 μm, which integrates the rate capability and compaction density of the Prussian white, has the rate capability better than that of the Prussian white of 2 μm to 3 μm, and has the compaction density higher than that of the Prussian white of 0.5 μm.

DETAILED DESCRIPTION

The technical solutions of the present disclosure will be described in further detail with reference to the accompanying drawings and the specific examples hereinafter.

The present disclosure will be further described in detail below. However, the following examples are only simple examples of the present disclosure, and do not represent or limit the protection scope of the rights of the present disclosure. The protection scope of the present disclosure is subject to the claims.

Example 1

The present example provided a method for regulating a particle size of Prussian white, comprising the following steps of:

(1) adding a sodium ferrocyanide solution with a concentration of 0.5 mol/L into a reaction kettle, starting stirring, controlling stirring rate at 300 rpm, raising the temperature to 60° C., introducing nitrogen, and pumping a food-grade manganese sulfate solution with a concentration of 1 mol/L and a sodium citrate solution with a concentration of 2 mol/L into the reaction kettle by a metering pump for a precipitation reaction, so as to generate Prussian white crystal nucleus with a particle size of 0.5 μm;

wherein a molar ratio of the food-grade manganese sulfate solution to the sodium citrate solution is 2:1; and an adding time of the food-grade manganese sulfate solution during the precipitation reaction is 1 hour;

(2) replacing the food-grade manganese sulfate solution with an industrial-grade manganese sulfate solution with a concentration of 1 mol/L, and keeping other conditions unchanged, so that the Prussian white crystal nucleus grows continuously to obtain a slurry; and wherein a total adding time of the food-grade manganese sulfate solution in the step (1) and the industrial-grade manganese sulfate solution in the step (2) is 8 hours; and a molar ratio of the sodium ferrocyanide to a total amount of the food-grade manganese sulfate solution in the step (1) and the industrial-grade manganese sulfate solution in the step (2) is 1.15:1; and (3) subjecting the slurry to an aging reaction at a temperature of 50° C. for 10 hours, separating the slurry in a centrifuge to obtain a filter cake, washing the filter cake with pure water to remove impurities in the filter cake, and then drying the filter cake at 160° C. to obtain a Prussian white product.

Figure 1:
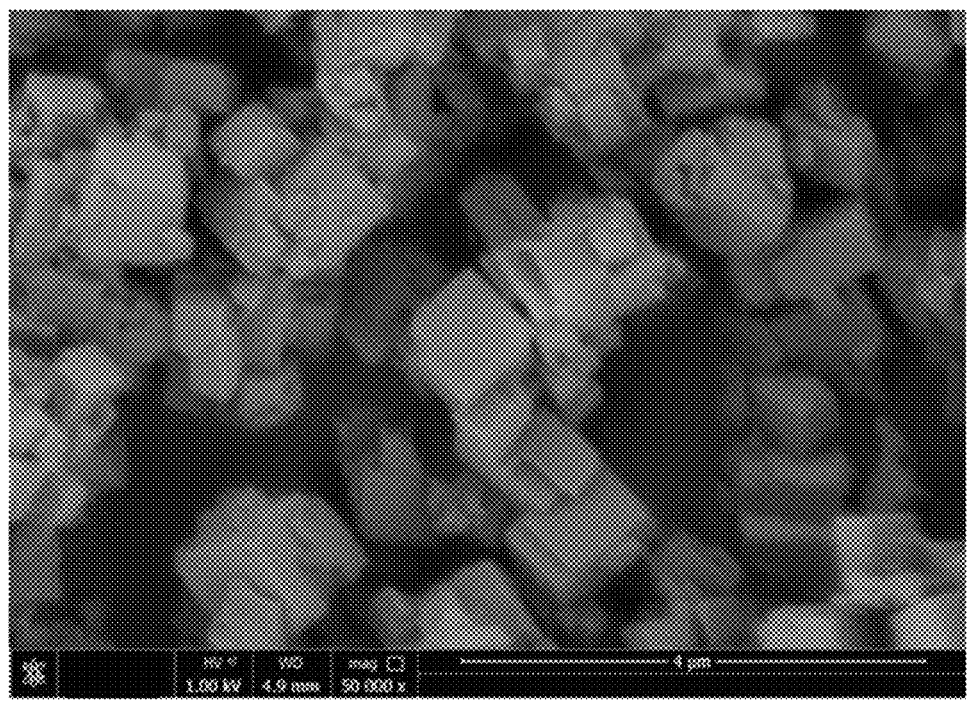
FIG. 1 is an SEM graph of a Prussian white product obtained in Example 1.

A SEM graph of the Prussian white product obtained in this example is shown in FIG. 1, and it can be seen from FIG. 1 that the Prussian white product is a cubic block.

Example 2

The present example provided a method for regulating a particle size of Prussian white, comprising the following steps of:

(1) adding a sodium ferrocyanide solution with a concentration of 0.5 mol/L into a reaction kettle, starting stirring, controlling stirring rate at 400 rpm, raising the temperature to 65° C., introducing nitrogen, and pumping a food-grade manganese sulfate solution with a concentration of 1.5 mol/L and a sodium citrate solution with a concentration of 3 mol/L into the reaction kettle by a metering pump for a precipitation reaction, so as to generate Prussian white crystal nucleus with a particle size of 0.5 μm;

wherein a molar ratio of the food-grade manganese sulfate solution to the sodium citrate solution is 2:1; and an adding time of the food-grade manganese sulfate solution during the precipitation reaction is 1.2 hours;

(2) replacing the food-grade manganese sulfate solution with an industrial-grade manganese sulfate solution with a concentration of 1.5 mol/L, and keeping other conditions unchanged, so that the Prussian white crystal nucleus grow continuously to obtain a slurry; and wherein a total adding time of the food-grade manganese sulfate solution in the step (1) and the industrial-grade manganese sulfate solution in the step (2) is 8 hours; and a molar ratio of the sodium ferrocyanide to a total amount of the food-grade manganese sulfate solution in the step (1) and the industrial-grade manganese sulfate solution in the step (2) is 1.15:1; and (3) subjecting the slurry to an aging reaction at a temperature of 50° C. for 10 hours, separating the slurry in a centrifuge to obtain a filter cake, washing the filter cake with pure water to remove impurities in the filter cake, and then drying the filter cake at 170° C. to obtain a Prussian white product.

Example 3

The present example provided a method for regulating a particle size of Prussian white, comprising the following steps of:
(1) adding a sodium ferrocyanide solution with a concentration of 0.4 mol/L into a reaction kettle, starting stirring, controlling stirring rate at 500 rpm, raising the temperature to 60° C., introducing nitrogen, and pumping a food-grade manganese sulfate solution with a concentration of 1.5 mol/L and a sodium citrate solution with a concentration of 4 mol/L into the reaction kettle by a metering pump for a precipitation reaction, so as to generate Prussian white crystal nucleus with a particle size of 0.6 μm;
wherein a molar ratio of the food-grade manganese sulfate solution to the sodium citrate solution is 2.5:1; and an adding time of the food-grade manganese sulfate solution during the precipitation reaction is 0.5 hour;
(2) replacing the food-grade manganese sulfate solution with an industrial-grade manganese sulfate solution with a concentration of 1.5 mol/L, and keeping other conditions unchanged, so that the Prussian white crystal nucleus grow continuously to obtain a slurry; and
wherein a total adding time of the food-grade manganese sulfate solution in the step (1) and the industrial-grade manganese sulfate solution in the step (2) is 8 hours; and
a molar ratio of the sodium ferrocyanide to a total amount of the food-grade manganese sulfate solution in the step (1) and the industrial-grade manganese sulfate solution in the step (2) is 1.1:1; and
(3) subjecting the slurry to an aging reaction at a temperature of 80° C. for 12 hours, separating the slurry in a centrifuge to obtain a filter cake, washing the filter cake with pure water to remove impurities in the filter cake, and then drying the filter cake at 170° C. to obtain a Prussian white product.

Example 4

The present example provided a method for regulating a particle size of Prussian white, comprising the following steps of:
(1) adding a sodium ferrocyanide solution with a concentration of 0.4 mol/L into a reaction kettle, starting stirring, controlling stirring rate at 380 rpm, raising the temperature to 65° C., introducing nitrogen, and pumping a food-grade manganese sulfate solution with a concentration of 0.8 mol/L and a sodium citrate solution with a concentration of 2 mol/L into the reaction kettle by a metering pump for a precipitation reaction, so as to generate Prussian white crystal nucleus with a particle size of 0.5 μm;
wherein a molar ratio of the food-grade manganese sulfate solution to the sodium citrate solution is 2.2:1; and an adding time of the food-grade manganese sulfate solution during the precipitation reaction is 0.15 hour;
(2) replacing the food-grade manganese sulfate solution with an industrial-grade manganese sulfate solution with a concentration of 0.8 mol/L, and keeping other conditions unchanged, so that the Prussian white crystal nucleus grow continuously to obtain a slurry; and
wherein a total adding time of the food-grade manganese sulfate solution in the step (1) and the industrial-grade manganese sulfate solution in the step (2) is 8 hours; and
a molar ratio of the sodium ferrocyanide to a total amount of the food-grade manganese sulfate solution in the step (1) and the industrial-grade manganese sulfate solution in the step (2) is 1.2:1; and
(3) subjecting the slurry to an aging reaction at a temperature of 90° C. for 12 hours, separating the slurry in a centrifuge to obtain a filter cake, washing the filter cake with pure water to remove impurities in the filter cake, and then drying the filter cake at 170° C. to obtain a Prussian white product.

Example 5

This example provided a method for regulating a particle size of Prussian white, wherein the method was the same as that of Example 1 except that the adding time of the food-grade manganese sulfate solution during the precipitation reaction in the step (1) was 0.1 hour.

Example 6

This example provided a method for regulating a particle size of Prussian white, wherein the method was the same as that of Example 1 except that the adding time of the food-grade manganese sulfate solution during the precipitation reaction in the step (1) was 2.5 hours.

Comparative Example 1

This comparative example provided a method for regulating a particle size of Prussian white, wherein the method was the same as that of Example 1 except that in the step (2), the food-grade manganese sulfate solution was not replaced with the industrial-grade manganese sulfate solution, i.e., the food-grade manganese sulfate solution was used for 8 hours.

Comparative Example 2

This comparative example provided a method for regulating a particle size of Prussian white, wherein the method was the same as that of Example 1 except that in the step (1), the food-grade manganese sulfate solution was replaced with the industrial-grade manganese sulfate solution, i.e., the industrial-grade manganese sulfate solution was used for 8 hours.

Figure 2:
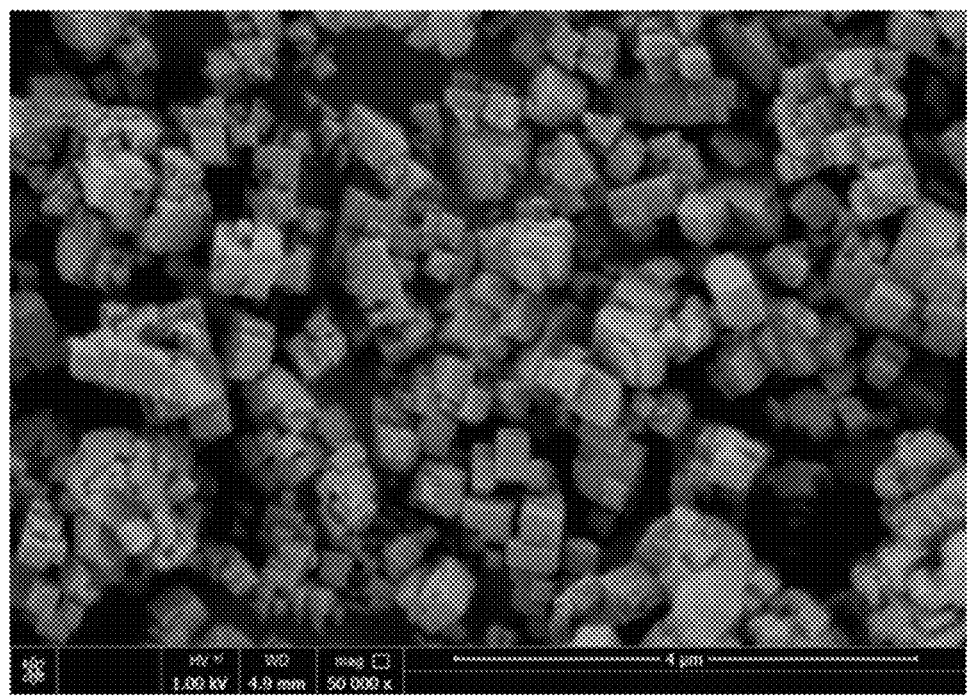
FIG. 2 is an SEM graph of a Prussian white product obtained in Comparative Example 1.
Figure 3:
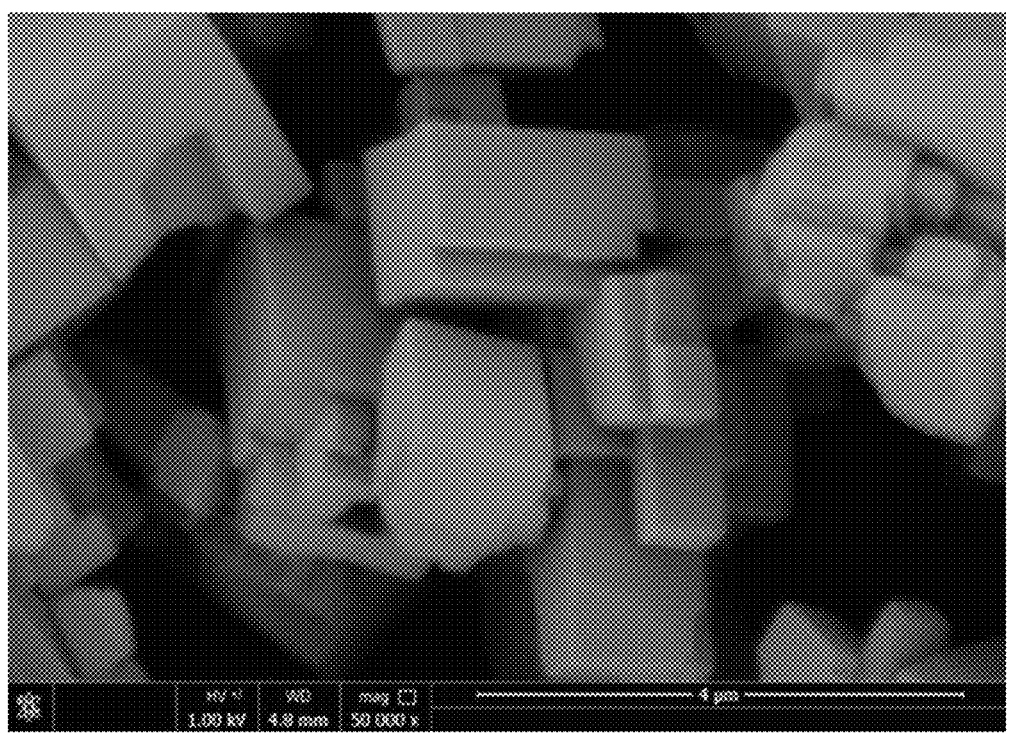
FIG. 3 is an SEM graph of a Prussian white product obtained in Comparative Example 2.

SEM images of the Prussian white products obtained in Comparative Examples 1 to 2 are shown in FIG. 2 and FIG. 3 respectively. As can be seen from the figures that, the shapes of the Prussian white products obtained in Comparative Examples 1 and 2 are the same as that of Example 1, all of which are cubic blocks, and the shape of the Prussian white product in Comparative Example 2 looks fuller.

The particle sizes of the Prussian white products obtained in the above examples and comparative examples were tested by a dry process particle sizer.

The compaction densities of the Prussian white products were measured with a compaction densimeter.

The Prussian white products were made into button half batteries, which were charged and discharged under a voltage of 2 V to 4 V at 0.1 C and 5 C respectively. The results were shown in Table 1.

TABLE 1

| Prussian white product | D50 (μm) | Compaction density (g/cm³) | Specific discharge capacity at 0.1 C (mAh/g) | Specific discharge capacity at 5 C (mAh/g) |
|---|---|---|---|---|
| Example 1 | 1.0 | 1.82 | 153 | 94 |
| Example 2 | 0.8 | 1.80 | 153 | 101 |
| Example 3 | 1.3 | 1.85 | 154 | 89 |
| Example 4 | 1.9 | 1.88 | 152 | 82 |
| Example 5 | 2.1 | 1.89 | 152 | 78 |
| Example 6 | 0.7 | 1.78 | 153 | 104 |
| Comparative Example 1 | 0.5 | 1.75 | 154 | 107 |
| Comparative Example 2 | 2.3 | 1.91 | 153 | 69 |

It can be seen from Table 1 that:
(1) It can be seen comprehensively from Examples 1 to 4 that the method for regulating the particle size of Prussian white provided by the present disclosure obtains the Prussian white with the particle size of 0.8 μm to 2 μm by switching between the food-grade manganese sulfate and the industrial-grade manganese sulfate, and the Prussian white with different particle sizes in Examples 1 to 4 have almost the same specific discharge capacity at 0.1 C, but as the particle size increases, the specific discharge capacity at 5 C decreases, and the compaction density increases. Therefore, the Prussian white product obtained by the method disclosed by the present disclosure can give consideration to both the compaction density and the rate capability to a certain extent.
(2) By combining Example 1 with Examples 5 to 6, it can be seen that because the adding time of the food-grade manganese sulfate in Example 5 is shorter, the particle size of the Prussian white is larger, which is 2.1 μm, and the compaction density thereof is higher than that of Example 1, but the rate capability thereof is worse than that of Example 1. Due to the longer adding time of the food-grade manganese sulfate in Example 6, the particle size of the Prussian white obtained is smaller, which is 0.7 μm, the rate capability thereof is better than that of Example 1, but the compaction density thereof is lower than that of Example 1. Therefore, in the present disclosure, by limiting the adding time of the food-grade manganese sulfate solution in a specific range during the precipitation reaction, the Prussian white products with a particle size of 0.8 μm to 2 μm can be obtained, which has excellent rate capability and high compaction density.
(3) It can be seen comprehensively from Example 1 and Comparative Examples 1 to 2 that, in Comparative Example 1, since only the food-grade manganese sulfate is used for the precipitation reaction, the particle size of the Prussian white obtained is only 0.5 μm, the specific discharge capacity at 0.1 C is 154 mAh/g, and the specific discharge capacity at 5 C is 107 mAh/g, the rate capability is good, but the compact density is significantly reduced which is only 1.75 g/cm³. In Comparative Example 2, since only the industrial-grade manganese sulfate is used for the precipitation reaction, the particle size of the Prussian white obtained is 2.3 μm, the compaction density is high, which is 1.91 g/cm³, but the specific discharge capacity at 5 C is greatly reduced to 69 mAh/g, and the rate capability is poor. Therefore, in the present disclosure, the food-grade manganese sulfate solution and the industrial-grade manganese sulfate solution are used successively to carry out the precipitation reaction with the sodium ferrocyanide solution, which can obtain the Prussian white with a specific particle size, and makes the Prussian white integrate excellent rate capability and high compaction density.

The applicant declares that the foregoing descriptions are merely specific examples of the present disclosure, but the protection scope of the present disclosure is not limited thereto. Any person skilled in the art can easily make changes or substitutions within the technical scope of the present disclosure, and all the changes or substitutions should be covered by the protection scope of the present disclosure.

The invention claimed is:

1. A method for regulating a particle size of Prussian white, comprising the following steps of:
   (1) adding a food-grade manganese sulfate solution and a complexing agent solution into a sodium ferrocyanide solution for a precipitation reaction to generate Prussian white crystal nucleus;
   (2) replacing the food-grade manganese sulfate solution with an industrial-grade manganese sulfate solution, and keeping other conditions unchanged, so that the Prussian white crystal nucleus grows continuously to obtain a slurry; and
   (3) successively subjecting the slurry to an aging reaction, solid-liquid separation, washing and drying to obtain a Prussian white product with a specific particle size.

2. The method according to claim 1, wherein in the step (1), the complexing agent solution comprises any one or a combination of at least two of a citric acid solution, a maleic acid solution, a wolfberry acid solution, an ethylenediamine tetraacetic acid solution, a sodium citrate solution, or aqueous ammonia.

3. The method according to claim 1, wherein a concentration of the sodium ferrocyanide solution in the step (1) is 0.3 mol/L to 0.6 mol/L;
   a concentration of the food-grade manganese sulfate solution is 0.4 mol/L to 2 mol/L; and
   a concentration of the complexing agent solution is 0.4 mol/L to 15 mol/L.

4. The method according to claim 1, wherein a molar ratio of the food-grade manganese sulfate solution to the complexing agent solution in the step (1) is (0.1 to 20):1;
   the precipitation reaction is carried out at a temperature of 50° C. to 98° C.;
   nitrogen is introduced during the precipitation reaction;
   stirring is carried out during the precipitation reaction, and the stirring is carried out at a rate of 200 rpm to 500 rpm; and
   an adding time of the food-grade manganese sulfate solution during the precipitation reaction is 0.12 hour to 2 hours.

5. The method according to claim 1, wherein a particle size of the Prussian white crystal nucleus in the step (1) is 0.3 μm to 0.6 μm.

6. The method according to claim 1, wherein a concentration of the industrial-grade manganese sulfate solution in the step (2) is 0.4 mol/L to 2 mol/L.

7. The method according to claim 1, wherein a total adding time of the food-grade manganese sulfate solution in the step (1) and the industrial-grade manganese sulfate solution in the step (2) is 8 hours; and
a molar ratio of the sodium ferrocyanide to a total amount of the food-grade manganese sulfate solution in the step (1) and the industrial-grade manganese sulfate solution in the step (2) is (1 to 1.2): 1.

8. The method according to claim 1, wherein the aging reaction is carried out at a temperature of 30° C. to 98° C.;
the aging reaction lasts for 3 hours to 24 hours;
the washing comprises pure water washing; and
the drying is carried out at a temperature of 150° C. to 180° C.

9. The method according to claim 1, wherein the particle size of the Prussian white product in the step (3) is 0.8 μm to 2 μm.

10. The method according to claim 1, comprising the following steps of:
(1) adding the food-grade manganese sulfate solution with a concentration of 0.4 mol/L to 2 mol/L and the complexing agent solution with a concentration of 0.4 mol/L to 15 mol/L into the sodium ferrocyanide solution with a concentration of 0.3 mol/L to 0.6 mol/L, introducing nitrogen, and carrying out the precipitation reaction at a temperature of 50° C. to 98° C. at a stirring rate of 200 rpm to 500 rpm to generate the Prussian white crystal nucleus with a particle size of 0.3 μm to 0.6 μm;
wherein the complexing agent solution comprising any one or a combination of at least two of a citric acid solution, a maleic acid solution, a wolfberry acid solution, an ethylenediamine tetraacetic acid solution, a sodium citrate solution, or aqueous ammonia; a molar ratio of the food-grade manganese sulfate solution to the complexing agent solution is (0.1 to 20): 1; and an adding time of the food-grade manganese sulfate solution during the precipitation reaction is 0.12 hour to 2 hours;
(2) replacing the food-grade manganese sulfate solution with the industrial-grade manganese sulfate solution with a concentration of 0.4 mol/L to 2 mol/L, and keeping other conditions unchanged, so that the Prussian white crystal nucleus grows continuously to obtain a slurry;
wherein a total adding time of the food-grade manganese sulfate solution in the step (1) and the industrial-grade manganese sulfate solution in the step (2) is 8 hours; and
a molar ratio of the sodium ferrocyanide to a total amount of the food-grade manganese sulfate solution in the step (1) and the industrial-grade manganese sulfate solution in the step (2) is (1 to 1.2): 1; and
(3) successively subjecting the slurry to the aging reaction at a temperature of 30° C. to 98° C. for 3 hours to 24 hours, solid-liquid separation, pure water washing and drying at a temperature of 150° C. to 180° C. to obtain the Prussian white product with a particle size of 0.8 μm to 2 μm.

11. The method according to claim 2, wherein a concentration of the sodium ferrocyanide solution in the step (1) is 0.3 mol/L to 0.6 mol/L;
a concentration of the food-grade manganese sulfate solution is 0.4 mol/L to 2 mol/L; and
a concentration of the complexing agent solution is 0.4 mol/L to 15 mol/L.

12. The method according to claim 2, wherein a molar ratio of the food-grade manganese sulfate solution to the complexing agent solution in the step (1) is (0.1 to 20): 1;
the precipitation reaction is carried out at a temperature of 50° C. to 98° C.;
nitrogen is introduced during the precipitation reaction;
stirring is carried out during the precipitation reaction, and the stirring is carried out at a speed of 200 rpm to 500 rpm; and
an adding time of the food-grade manganese sulfate solution during the precipitation reaction is 0.12 hour to 2 hours.

13. The method according to claim 2, wherein a particle size of the Prussian white crystal nucleus in the step (1) is 0.3 μm to 0.6 μm.

14. The method according to claim 2, wherein a concentration of the industrial-grade manganese sulfate solution in the step (2) is 0.4 mol/L to 2 mol/L.

15. The method according to claim 2, wherein a total adding time of the food-grade manganese sulfate solution in the step (1) and the industrial-grade manganese sulfate solution in the step (2) is 8 hours; and
a molar ratio of the sodium ferrocyanide to a total amount of the food-grade manganese sulfate solution in the step (1) and the industrial-grade manganese sulfate solution in the step (2) is (1 to 1.2): 1.

16. The method according to claim 2, wherein the aging reaction is carried out at a temperature of 30° C. to 98° C.;
the aging reaction lasts for 3 hours to 24 hours;
the washing comprises pure water washing; and
the drying is carried out at a temperature of 150° C. to 180° C.

17. The method according to claim 2, wherein the particle size of the Prussian white product in the step (3) is 0.8 μm to 2 μm.

18. The method according to claim 3, wherein a molar ratio of the food-grade manganese sulfate solution to the complexing agent solution in the step (1) is (0.1 to 20): 1;
the precipitation reaction is carried out at a temperature of 50° C. to 98° C.;
nitrogen is introduced during the precipitation reaction;
stirring is carried out during the precipitation reaction, and the stirring is carried out at a rate of 200 rpm to 500 rpm; and
an adding time of the food-grade manganese sulfate solution during the precipitation reaction is 0.12 hour to 2 hours.

19. The method according to claim 3, wherein a particle size of the Prussian white crystal nucleus in the step (1) is 0.3 μm to 0.6 μm.

20. The method according to claim 3, wherein a concentration of the industrial-grade manganese sulfate solution in the step (2) is 0.4 mol/L to 2 mol/L.

* * * * *